Patented May 23, 1933

1,910,470

UNITED STATES PATENT OFFICE

GEORG KRÄNZLEIN, HEINRICH VOLLMANN, AND ERNEST DIEFENBACH, OF FRANK-FORT-ON-THE-MAIN-HOCHST, GERMANY, ASSIGNORS TO GENERAL ANILINE WORKS, INC., OF NEW YORK, N. Y., A CORPORATION OF DELAWARE

HALOGEN-NAPHTHALENE-KETONES AND PROCESS OF PREPARING THEM

No Drawing. Application filed November 12, 1928, Serial No. 319,003, and in Germany November 26, 1927.

The present invention relates to halogenated-naphthalene-ketones and to a process of preparing them.

By the action of carboxylic acid chlorides upon naphthalene in the presence of aluminium chloride, mono-ketones are formed. According to the kind of the carboxylic acid and the conditions under which the process is carried out, especially the degree of temperature, there are chiefly produced $\alpha$- or $\beta$-mono-ketones. The action of carboxylic acid chlorides in the presence of aluminium chlorides upon substitution products of naphthalene has only been fully studied as regards the naphthols and naphthol ethers. Thus by the action of acetyl chloride and aluminium chloride upon $\beta$-naphthol, 2-hydroxy-1-acetylnaphthalene is formed (see Fries "Berichte der deutschen Chemischen Gesellschaft" volume 54, page 711) and by the action of aluminium chloride and benzoyl chloride upon $\alpha$-naphthol-ethylether especially 1-ethoxy-4-benzoylnaphthalene is obtained (see Scholl "Annalen der Chemie" volume 398, page 85/86). In these cases the hydroxyl- and alkoxyl group respectively greatly promotes the reaction of Friedel-Crafts according to known principles. The action of acetyl chloride upon $\alpha$- and $\beta$-mono-bromnaphthalene is described by Schweizer in "Berichte der deutschen Chemischen Gesellschaft" volume 24, page 55. Nothing has hitherto been published as regards the possibility of applying Friedel-Crafts reaction to a polyhalogenated-naphthalene.

Now we have found that by causing a compound of the formula R.CO.X wherein X stands for halogen or the group —O.CO.R and R stands for alkyl or aryl, that is to say a carboxylic acid chloride or a carboxylic acid anhydride and aluminum chloride to act upon a poly-halogenated-naphthalene characteristic and well defined ketone derivatives may be obtained with a good yield. Thus for instance 1.4- as well as 1.5-dichlornaphthalene yield with benzoyl chloride uniform mono-ketone derivatives in approximately quantitative yield. Substituted aroyl chlorides, for instance ortho- and para-chlorbenzoyl chloride, alpha naphthoyl chloride, furthermore methoxy-benzoyl chloride, acetyl chloride and propionyl chloride react like benzoyl chloride. Thus compounds are formed, which may be characterized by the following formula:

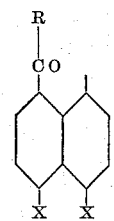

wherein R stands for alkyl or aryl and one of the X's for chlorine, the other X for hydrogen.

The halogenated-naphthalene ketones obtainable according to the present invention, are important intermediate products for the preparation of dyestuffs.

The following examples serve to illustrate our invention, but they are not intended to limit it thereto, the parts being by weight.

(1) 35 parts of aluminium chloride are stirred together with 60 parts of carbon disulfide and a solution of 20 parts of 1.4-dichlornaphthalene in 16 parts of benzoyl chloride and 70 parts of carbon disulfide is then added thereto. The mixture is kept moderately boiling on the water bath during 7 hours, whereupon it is decomposed with water. After the carbon disulfide has been driven out, the mass is boiled up with soda solution, filtered and the residue is twice boiled with diluted hydrochloric acid and finally washed until neutral. The resulting crude product may be recrystallized from alcohol while adding animal charcoal. Thus colorless prisms are obtained melting at 104° C. to 105° C.; which, when dissolved in concentrated sulfuric acid give a yellow solution. The product probably constitutes the 1.4-dichlor-8-benzoylnaphthalene of the following formula:

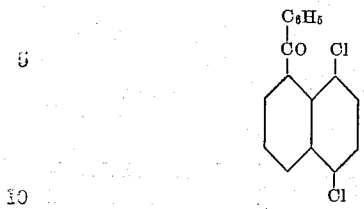

(2) 30 parts of 1.4-dichlornaphthalene are dissolved, while stirring (in the oil bath) in 63 parts of benzoyl chloride whereupon 60 parts of aluminium chloride are added. The temperature of the oil bath is gradually raised within 8 hours to 160° C. After cooling, the solidified reaction product is distilled with steam, the product remaining after distillation is twice boiled up with diluted hydrochloric acid, washed until neutral and dried. The product after being purified possesses the same properties as that described in Example 1.

(3) 50 parts of 1.5-dichlornaphthalene are stirred together with 350 parts of carbon disulfide, 38 parts of benzoyl chloride and 70 parts of aluminium chloride for about 15 hours on the water bath under reflux.

By decomposing the mass with water, washing and drying, the solid crude ketone obtained may be distilled in vacuo at about 270° C. to 275° C. under a pressure of 15 mm. in order to purify it. The 8-benzoyl-1.5-dichlornaphthalene thus produced recrystallizes from alcohol in colorless, shining prisms, melting at 112° C.

(4) 20 parts of 1.5-dichlornaphthalene are stirred together with 18 parts of pulverized phthalic anhydride and 150 parts of carbon disulfide and 25 parts of aluminium chloride are then introduced. The mixture is kept boiling for 8 hours while stirring. After having decomposed the mass with water and expelled the carbon disulfide, it is boiled up three times with diluted hydrochloric acid and twice with water and the residue, after having been made alkaline with caustic soda solution, is distilled with steam in order to free it from dichlornaphthalene. The undissolved content of the matrass is filtered off and the reaction product dissolved in the filtrate, is precipitated by means of an acid. The colorless body thus obtained dissolves in concentrated sulfuric acid to a yellow solution, which on heating turns red-violet.

(5) 1.4 - dichlor - 8 - (para - chlorbenzoyl - naphthalene: 100 parts of 1.4-dichlornaphthalene, 88 parts of para-chlorbenzoyl chloride and 135 parts of aluminium chloride are introduced into 500 parts of carbon disulfide and the mixture is stirred for 20 hours on the water bath under reflux. The reaction mixture is decomposed with ice water, distilled with water vapor for 2 hours, then boiled twice with diluted hydrochloric acid and water. After drying, the resinous crude ketone is subjected to distillation in vacuo in order to free it from any unattached dichlornaphthalene. The tough yellow oil thus obtained is triturated with much alcohol and thus obtained in a crystalline form. In order to purify it further, it may be recrystallized from ethyl alcohol. The final product forms colorless needles melting at 118° C.

(6) 1.4-dichloro-8-(ortho - chlorobenzoyl)-naphthalene: 57 parts of 1.4-dichloronaphthalene, 50 parts of ortho-chlorbenzoyl chloride and 80 parts of aluminium chloride are introduced into 300 parts of carbon disulfide and the whole is stirred for 15 hours at about 50° C.

The reaction product is worked up as indicated in the preceding example. It forms colorless prisms when recrystallized from alcohol and melts at 122° C. to 123° C.

(7) 1.4-dichloro-8-(α-naphthoyl)-naphthalene: 50 parts of 1.4-dichloronaphthalene, 50 parts of α-naphthoyl chloride and 70 parts of aluminium chloride are introduced into 300 parts of carbon disulfide and the whole is kept boiling for 20 hours on the water bath under reflux. The reaction product, when treated in the usual manner may directly be obtained in crystallized form from glacial acetic acid with an addition of animal charcoal. The final product forms yellowish prisms melting at 163° C. to 164° C.

(8) 1.4-dichloro-8-(β-naphthoyl)-naphthalene: 75 parts of 1.4-dichloronaphthalene, 75 parts of β-naphthoyl chloride, 105 parts of aluminium chloride are introduced into 450 parts of carbon disulfide and the mixture is stirred for 12 hours on the water bath under reflux. The ketone, after being worked up in the usual manner constitutes when cold a very brittle, brown resin, which can be recrystallized from glacial acetic acid.

(9) 1.4-dichloro-8-(para-toluyl)-naphthalene: 100 parts of 1.4-dichloronaphthalene, 80 parts of para-toluic acid chloride, 135 parts of aluminium chloride are introduced into 500 parts of carbon disulfide and the mixture is stirred for 15 hours on the water bath under reflux. The product is worked up as above indicated. The crude ketone is purified by distillation in vacuo, the fraction distilling over between 275° C. and 280° C. (under 15 mm. pressure) being collected. The light-yellow resin, which when cold becomes brittle, is obtained by recrystallization from glacial acetic acid in small colorless prisms. The resulting substance melts after a previously extensive sintering at 135° C. but not sharply.

(10) 100 parts of 1.4-dichloronaphthalene, 80 parts of ortho-toluyl chloride, 136 parts of aluminium chloride are introduced into 500 parts of carbon disulfide and the mixture is stirred on the water bath for 20 hours under reflux. The product is worked up as indicated in the preceding example. The bright yellow resin obtainable by distillation in vacuo shows only a slight tendency to crystallization. It crystallizes from alcohol in colorless prisms, melting at 91° C. to 92° C. It dissolves in concentrated sulfuric acid to a yellow solution.

(11) 100 parts of 1.4-dichloronaphthalene, 45 parts of acetyl chloride and 135 parts of aluminium chloride are introduced into 500 parts of carbon disulfide and the mixture is stirred for 15 hours under reflux. The reaction product, after being worked up in the usual manner is purified by repeated distillation in vacuo. It boils at 250° C. under a pressure of 13 mm. and forms a yellow oil, having very slight tendency to crystallization.

(12) 57.2 parts of 1.4-dibromnaphthalene and 30 parts of benzoyl chloride are dissolved in 300 parts of carbon disulfide and there are then introduced 55 parts of pulverized aluminium chloride at room temperature. After heating the whole for 4 hours on the water bath, it is decomposed with water and worked up as indicated in the preceding examples.

By recrystallizing from alcohol or glacial acetic acid, colorless needles are obtained.

Instead of carbon disulfide, any other suitable diluent may be used in the examples, such as for instance nitrobenzene.

We claim:

1. As new products, the compounds of the following formula

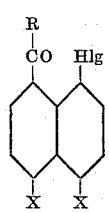

wherein R stands for alkyl or aryl, Hlg for a halogen atom, one of the X's for a halogen atom, the other X for hydrogen being colorless, well crystallizing compounds, dissolving in concentrated sulfuric acid with a yellow to orange-yellow coloration.

2. As new products, the compounds of the following formula

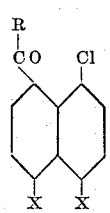

wherein R stands for alkyl or aryl, one of the X's for chlorine, the other X for hydrogen, being colorless, well crystallizing compounds, dissolving in concentrated surfuric acid with a yellow to orange-yellow coloration.

3. As new products, the compounds of the following formula

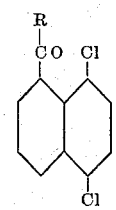

wherein R represents a phenyl group, which may be substituted by halogen, methyl or the carboxy group, being colorless, well crystallizing compounds, dissolving in concentrated sulfuric acid with a yellow to orange-yellow coloration.

4. As a new product, the compound of the following formula

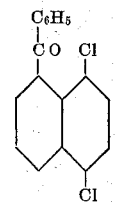

being colorless prisms, melting at 104° C. to 105° C. and dissolving in concentrated sulfuric acid to a yellow solution.

5. The process which comprises heating a compound of the following general formula: R.CO.X wherein X stands for halogen or the group —O.CO.R and R represents alkyl or aryl, with a dihalogenated naphthalene in the presence of aluminium chloride.

6. The process which comprises heating an aroylchloride with a dihalogenated naphthalene in the presence of aluminium chloride.

7. The process which comprises heating a benzoyl chloride in the presence of aluminium chloride and of a diluent with a compound of the group consisting of 1.4-dichloronaphthalene and 1.5-dichloro-naphthalene.

8. The process which comprises heating benzoyl-chloride with 1.4-dichloro-naphthalene on a water bath for several hours in the presence of aluminium chloride and carbon disulfide.

9. The process which comprises heating para-chloro-benzoylchloride with 1.4-dichloro-naphthalene on the water bath for several hours in the presence of aluminium chloride and carbon disulfide.

10. The process which comprises heating para-toluic acid chloride with 1.4-dichloro-naphthalene on the water bath for several hours in the presence of aluminium chloride and carbon disulfide.

11. As a new product, the compound of the following formula:
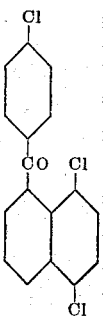
forming colorless needles melting at 118° C.
12. As a new product, the compound of the following formula:
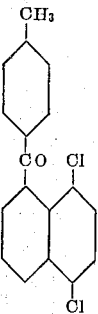
forming after recrystallization from glacial acetic acid small colorless prisms melting at about 135° C.
In testimony whereof, we affix our signatures.
GEORG KRÄNZLEIN.
HEINRICH VOLLMANN.
ERNST DIEFENBACH.